US007811629B2

(12) United States Patent
Rowley

(10) Patent No.: US 7,811,629 B2
(45) Date of Patent: Oct. 12, 2010

(54) METHOD OF APPLYING A PATCH TO A FASTENER

(75) Inventor: Terry J. Rowley, Cincinnati, OH (US)

(73) Assignee: Long-Lok Fasteners Corporation, Cincinnati, OH (US)

( * ) Notice: Subject to any disclaimer, the term of this patent is extended or adjusted under 35 U.S.C. 154(b) by 418 days.

(21) Appl. No.: 11/906,305

(22) Filed: Oct. 1, 2007

(65) Prior Publication Data

US 2009/0087555 A1 Apr. 2, 2009

(51) Int. Cl.
*B05D 1/12* (2006.01)

(52) U.S. Cl. ........................ 427/195; 427/197; 427/287

(58) Field of Classification Search ................. 427/195, 427/197, 287
See application file for complete search history.

(56) References Cited

U.S. PATENT DOCUMENTS 3,720,533 A * 3/1973 Gallagher ................... 427/185
3,831,213 A 8/1974 Bedi
4,018,952 A 4/1977 Brigham et al.
4,023,224 A 5/1977 Frailly
4,652,468 A 3/1987 Gould et al.
4,779,559 A 10/1988 Gould et al.
4,920,911 A 5/1990 Gould et al.
4,927,307 A 5/1990 Fitzgerald et al.
5,015,501 A 5/1991 Johnson
5,620,520 A 4/1997 Duffy et al.
5,679,160 A 10/1997 Wallace et al.
5,792,512 A 8/1998 Duffy et al.
5,918,727 A 7/1999 Wallace et al.
5,928,711 A 7/1999 Wallace et al.
6,004,627 A * 12/1999 Duffy et al. ................. 427/425
6,027,568 A 2/2000 Wallace et al.
6,156,392 A 12/2000 Duffy et al.
6,641,671 B2 11/2003 Shinozaki et al.
6,761,126 B2 * 7/2004 DiMaio et al. .............. 118/306

* cited by examiner

*Primary Examiner*—Frederick J Parker
(74) *Attorney, Agent, or Firm*—Cislo & Thomas, LLP

(57) ABSTRACT

A patch application system is provided comprising a powder application booth. The powder application booth comprises a powder block to temporarily house the powder prior to ejection, a nozzle insert to guide the powder onto the screw, a support stand to adjust the powder block to the appropriate position relative to the screw for a desired patch location and size, a powder cup to deliver the powder to the powder block. A programmable logic controller electronically coupled to the micro air-switch valve controls the duration the air-switch valve remains open. The entire process may be automated by including a screw hopper to temporarily store a plurality of screws, a bowl feeder receiving the screws and delivering the screws to a rotating disk, wherein the rotating disk passes the screws through a heating element and presents the heated screws to the powder application booth.

12 Claims, 6 Drawing Sheets

METHOD OF APPLYING A PATCH TO A FASTENER

COPYRIGHT NOTICE

Portions of the disclosure of this patent document may contain material that is subject to copyright and/or mask work protection. The copyright and/or mask work owner has no objection to the facsimile reproduction by anyone of the patent document or the patent disclosure, as it appears in the U.S. Patent and Trademark Office patent file or records, but otherwise reserves all copyright and/or mask work rights whatsoever.

TECHNICAL FIELD

This invention relates to fasteners, particularly, methods and systems of producing self-locking fasteners.

BACKGROUND ART

One of the problems associated with threaded fasteners is the accidental disassembly when pre-load is lost. When pre-load is lost, a standard fastener quickly vibrates out, causing the assembly to loosen. ©1993-2006 Long-Lok Fasteners Corporation.

A threaded fastener of the prevailing torque type is frictionally resistant to rotation due to a built-in wedge. Such fastener retains its locking ability independent of axial tension or pre-load. Self-locking fasteners of this type were developed to retain the advantage of reusability while preventing the problems of accidental disassembly when pre-load is lost. ©1993-2006 Long-Lok Fasteners Corporation.

Jam nuts, cotter pins, lock nuts, lock washers and similar devices also prevent the loss of the bolt or nut by back off but they result in added weight, inconvenience and cost. They do not reduce the tendency to fatigue when loose. Further, the insecurity of conventional mechanical locks is reason enough for most designers to reject them. Such insecurity arises from the frequency of split-type washers breaking, damage to surface areas caused by external locking devices, and the ineffectiveness of such devices when adjustments are needed. ©1993-2006 Long-Lok Fasteners Corporation.

A prevailing torque type fastener or self-locking fastener was developed to retain the advantage of reusability while preventing the problems of accidental disassembly when pre-load is lost. Self-locking fasteners virtually eliminate the possibility of a bolted assembly coming apart during operation. To achieve this benefit, the self-locking fastener has to be properly designed, engineered and installed. Self-locking helps maintain a tight joint and also helps prevent fatigue failure in the joint. Self-locking fasteners resist rotation on the first installation and on subsequent installations and removals. In addition, self-locking fasteners also decrease the tendency of the fastener to fatigue by reducing the vibration transferred to the fastener. ©1993-2006 Long-Lok Fasteners Corporation.

One of the earliest methods of producing prevailing torque type locking features (also referred to as "patches" in the art) on externally threaded fasteners was the "spray-on" nylon patch. In this type of patch, nylon resin is deposited on the threads of screws, which had been pre-heated to a temperature range slightly above the melting point of the plastic powder, thus allowing the plastic powder to melt rapidly upon contact with the hot threads. This mass of molten plastic was then "quenched" in a water/oil medium to cool the screws, leaving a deposit of plastic firmly attached within a predetermined location of the screw threads. This predetermined deposit of plastic is referred to as a "patch."

To produce an effective patch the following principles must be considered: 1) transferring the plastic resin to the hot screws, 2) controlling the amount of powder to be deposited (patch geometry), and 3) controlling the patch location on the screw.

Many techniques and methods have been employed over the years to apply plastic nylon resin to the hot screws in order to produce "locking" features or "patches". Some obvious strategies included incorporating "gravity" and letting powder free-fall over the hot screw threads. Others have utilized shaking bars, spray bars, and spray nozzles powered by compressed air. Due to the uncontrollable nature of the propelled powder, devices, such as barriers, templates, and spray tips, have been utilized. One method uses nozzles made from standard elongated copper tubing in an attempt to force the powder spray pattern to conform to the screw thread profile.

In order to provide some consistency in the prevailing torque characteristics, control of the deposited plastic resin on the screw must be achieved. Many techniques have been employed to control the location and geometry of the patches. The technique typically involves strategically located "jets" of air to prevent powder from contacting the hot screw heads in areas where powder is unwanted (e.g. lead-in). The amount of patch material to be deposited is determined by the volume of the powder contacting the threads and melting in place. The circumferential coverage is not typically considered a critical characteristic of the patch, so the patch may typically range from 60° to a full 360° circumferential coverage. The typical specification limit on the height of the patch over the major diameter is 0.003 inches.

Rotation of the screws as they pass-by the point of powder application and various air-jets, are typically utilized to control the patch geometry. The results are patches, which will yield prevailing torque within a pre-specified range.

Economics dictates what method is acceptable, since nylon resin powder is expensive and rework is costly. Another interesting dilemma is encountered when attempting to re-use powder that did adhere during initial application. Particles of the powder may have actually melted, but not adhered to the screw. When re-used, multiple melting of the powder has been show to cause degradation of the resin properties. These properties can affect prevailing torque characteristics.

SUMMARY OF INVENTION

The purpose of the plastic is to provide frictional resistance with the mating threads when engaged, thus creating a desired resistance to rotation of the screw, as it is assembled with the nut or threaded component. The absence of patch material in the first one to two threads is typically required in order to allow initial hand assembly of the screws.

The plastic resin that does not contact the hot screw threads or molten plastic is typically caught and re-claimed. Resin that finds its way past the hot threads can account for over 75% of the powder passing through the system.

The three major components of the plastic resin patch application process are: 1) providing adequate patch volume, 2) providing one to two thread lead-in and proper patch length, and 3) dealing with significant "wasted resin."

It would be desirable to be able to pre-determine the required patch geometry (length×width×thickness) and control the lead-in with orifice location adjustment. In such case, the need for supplemental air-jets, barriers and templates would be advantageously eliminated. Additionally, the ability to pre-determine the geometry of the powder mass would lead to minimizing wasted powder.

In accordance with one aspect of the present invention, a patch application system is provided comprising a powder application booth comprising a shaft encoder, wherein the shaft encoder senses the presence of the screw and sends a signal to a programmable logic controller to deliver a puff of air through the powder block to eject the powder onto the screw; a rotating disk to deliver the screw to the powder application booth; an induction heating coil adjacent to the rotating disk to heat the screw to a temperature that will cause the resin to melt upon contact with the heated screw; a controller to regulate the temperature of the induction heating coil; a bowl feeder adjacent to the rotating disk to deliver the screw into a slot of the rotating disk; a screw hopper to connected to the bowl feeder, wherein the screw hopper contains a plurality of screws to be delivered to the rotating disk by the bowl feeder; a screw ejector adjacent to the rotating disk to eject the screw out of the slot; a parts discharge chute to catch the screw ejected from the slot; a cold water/oil quench below the parts discharge chute to capture and cool the ejected screw, thereby solidifying the resin onto the screw and providing for safe handling.

The powder application booth preferably comprises a powder block to temporarily house the powder prior to ejection, a nozzle insert to guide the powder onto the screw, a support stand to adjust the powder block to the appropriate position relative to the screw for a desired patch location and size, and a powder cup to deliver the powder to the powder block.

The powder application booth may further comprise a purge system to clean out unused powder, a micro air-switch valve to control a pulse of air entering into the powder block, an air dryer to assure the air is dry prior to entering the powder block, an air filter to assure the air is clean prior to entering the powder block, a precision regulator to adjust the pressure of the air sent into the powder block, an air compressor to provide the source of pressurized air, a programmable logic controller electronically coupled to the micro air-switch valve to control the duration the air-switch valve remains open, and a powder recovery system located below the screw to capture powder that does not fuse with the screw.

These and other aspects of the invention will become apparent from a review of the accompanying drawings and the following detailed description of the invention.

BEST MODE FOR CARRYING OUT THE INVENTION

The detailed description set forth below in connection with the appended drawings is intended as a description of illustrated exemplary embodiments and is not intended to represent the only forms in which these embodiments may be constructed and/or utilized. The description sets forth the functions and sequence of steps for constructing and operating the present invention in connection with the illustrated embodiments. However, it is to be understood that the same or equivalent functions and/or sequences may be accomplished by different embodiments that are also intended to be encompassed within the spirit and scope of the present invention.

The present invention is a patch application system comprising a powder application booth 100 to provide a self-locking fastener that is reusable while preventing the problems of accidental disassembly.

Figure 1:
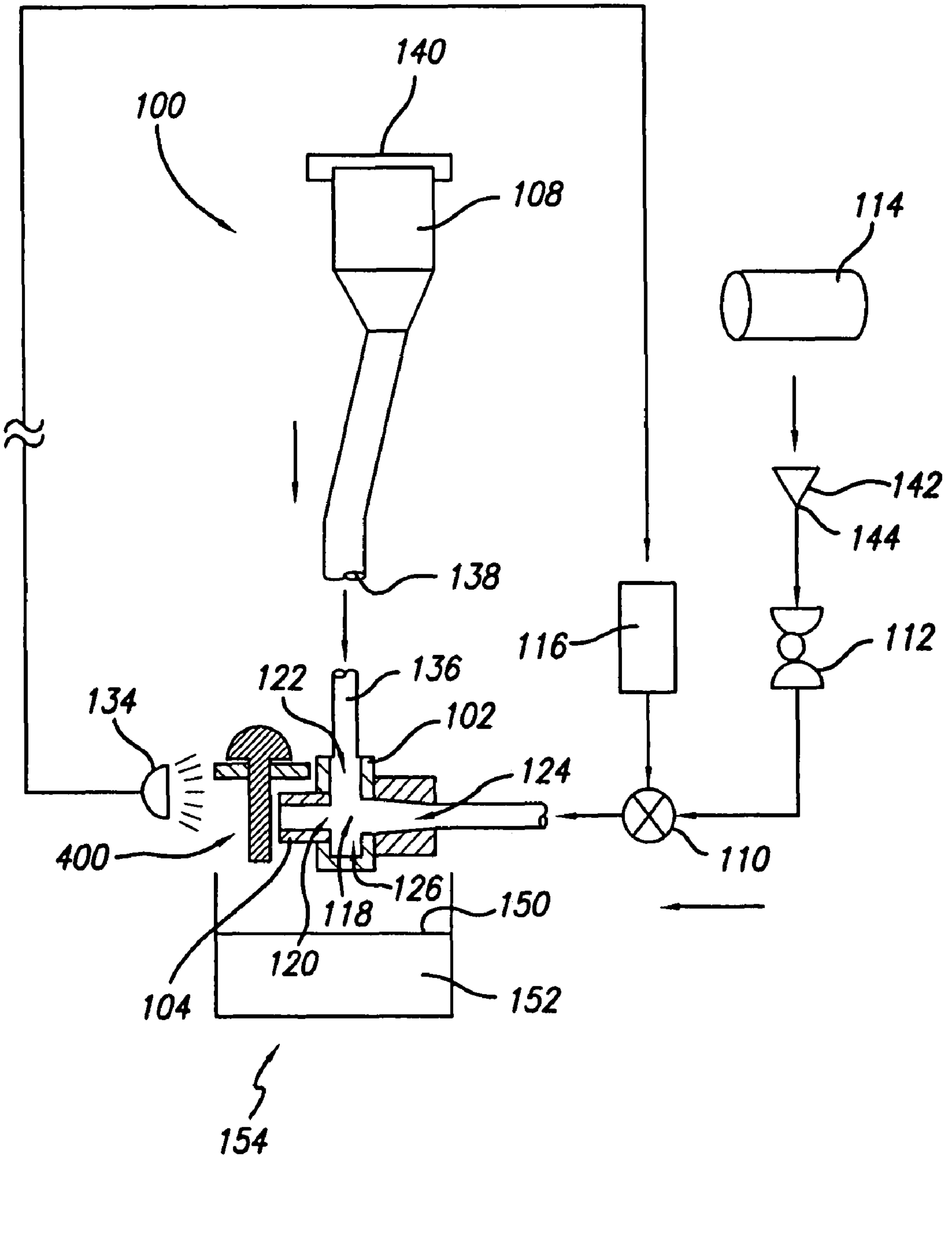
FIG. 1 is a cross sectional view of an embodiment of the powder application booth.
Figure 2B:
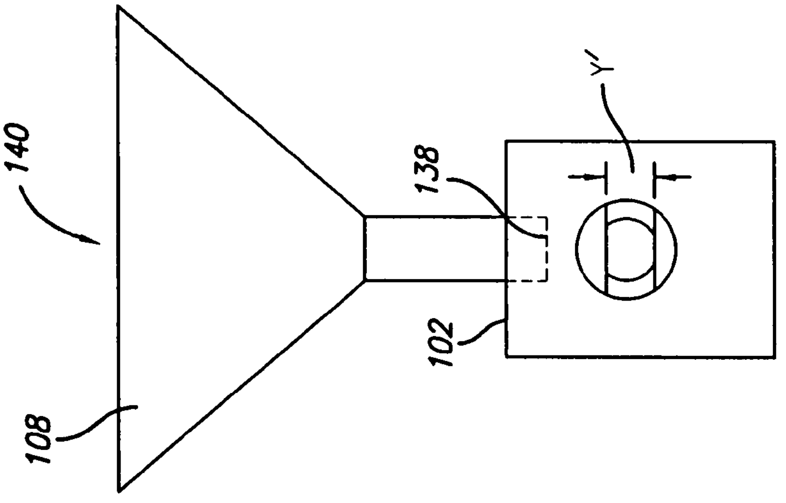
FIG. 2B is front view of an embodiment of the powder application booth.
Figure 2A:
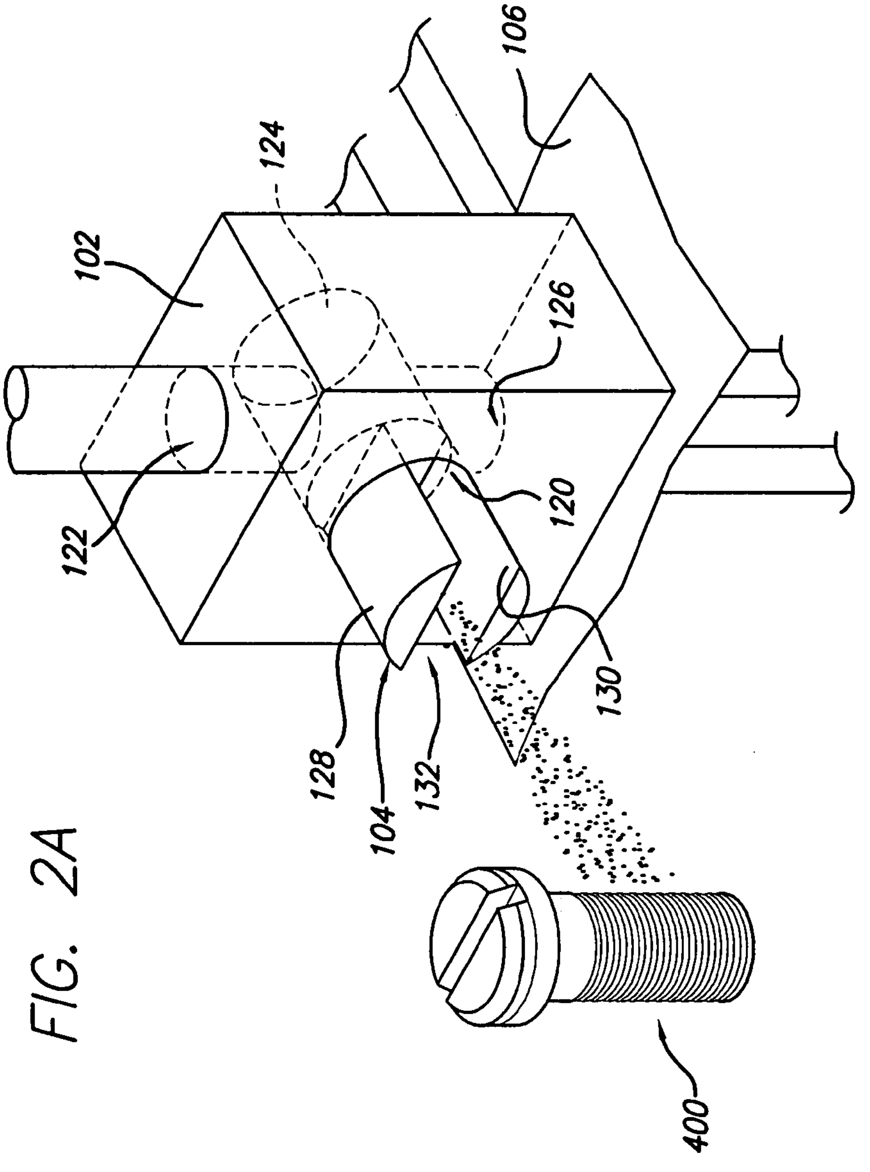
FIG. 2A is a perspective view of an embodiment of the powder application booth.

As shown in the embodiment of FIGS. 1 and 2A, the powder application booth 100 may comprise a powder block 102 and a nozzle insert 104. The powder application booth 100 may further comprise a support stand 106, a powder cup 108, a micro air-switch valve 110, a precision regulator 112, an air compressor 114, and a programmable logic controller 116.

In one embodiment, the powder block 102 comprises a chamber 118, a powder ejection orifice 120, a powder entry orifice 122, and an air flow orifice 124. Powder may be delivered into the chamber 118 through the powder entry orifice 122 and the powder in the chamber 118 is ejected onto a screw 400 through the powder ejection orifice 120 by a pulse of air delivered through the air flow orifice 124 by an air compressor 114 or the like. The powder ejection orifice 120, powder entry orifice 122, and air flow orifice 124 are generally circular. These orifices, however, can be any shape.

The powder is delivered to the chamber 118 through the powder entry orifice 122. The air flow orifice 124 and the powder ejection orifice 120 are small enough that when powder is delivered to the powder entry orifice 122, very little powder spills over towards the air flow orifice 124 or the powder ejection orifice 120. The weight of the powder coming through the powder entry orifice 122 should be sufficient to cause enough friction to facilitate immobilization of the powder within the chamber 118. The pulse of air can then eject a small quantity of powder through the powder ejection orifice 120 and onto the screw 400. The chamber 118 can further comprise a well 126 where the powder may accumulate.

Figure 3:
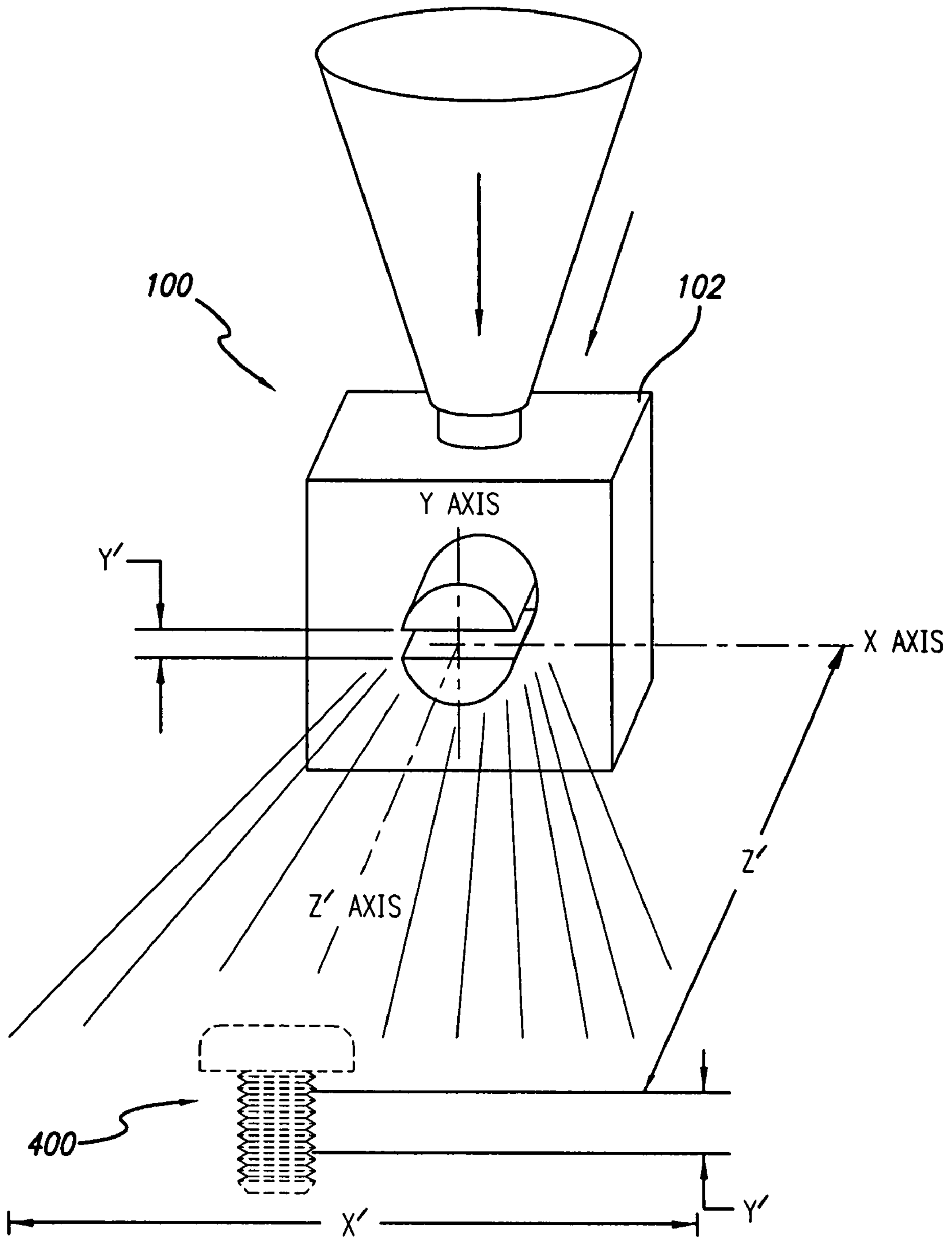
FIG. 3 is another perspective view of an embodiment of the powder application booth.
Figure 4A:
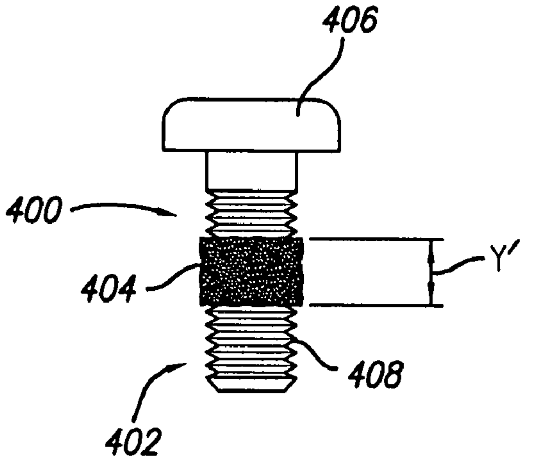
FIG. 4A is a side view of a fastener with an applied patch.

The nozzle insert 104 may be housed inside the powder ejection orifice 120. The nozzle insert 104 is generally cylindrical in shape and comprises an outer surface 128 and an inner surface 130. The outer surface 128 is substantially the same curvature as the powder ejection orifice 120 such that the nozzle insert 104 fits tightly in the powder ejection orifice 120. The inner surface 130 defines a cavity or gap 132 through which the powder travels to exit the chamber 118. The gap 132 is preferably truncated so as to form a rectangular slit as the opening. This truncated type opening facilitates a proper dispersion pattern of the powder. Specifically, as shown in FIG. 3, the rectangular slit or gap controls the vertical dispersion Y' of the powder while maintaining a degree of freedom for the horizontal dispersion X' of the powder. FIG. 4A shows a typical screw 400 comprising a head 406 and a threaded neck 408 with a patch 404 applied.

In one embodiment, the nozzle insert 104 is created by machining a gap of the desired dimensions. In another embodiment, the nozzle insert 104 may be made of different component parts.

Figure 4B:
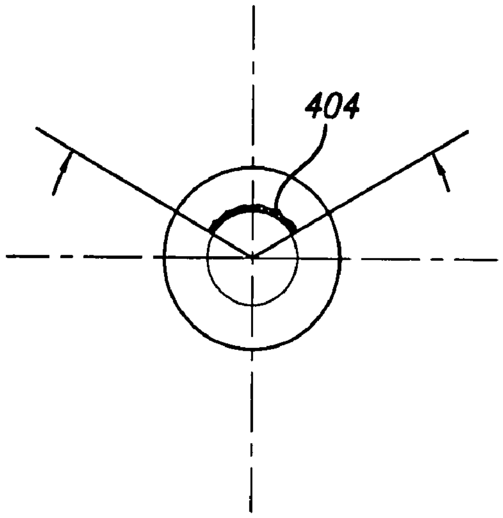
FIG. 4B is a bottom view of a fastener with an applied patch.
Figure 5:
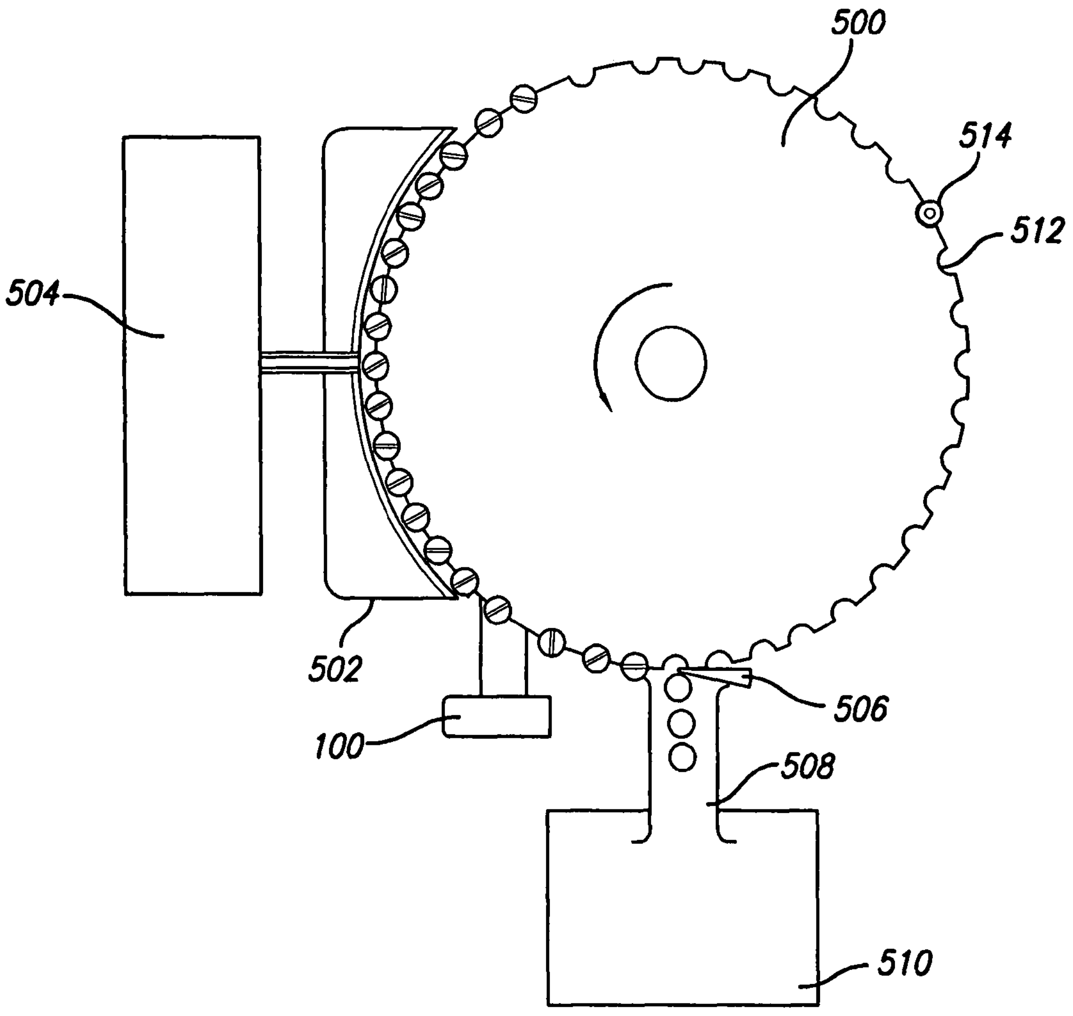
FIG. 5 is a top view of an embodiment of the patch application system.

As shown in FIG. 4B, the circumferential patch coverage may range from approximately 30° to a full 360° circumferential coverage. Preferably, the circumferential patch coverage ranges from approximately 60° to approximately full coverage. Circumferential patch coverage is achieved by allowing the powder to melt on the fastener and allowing the melted powder to flow around the threads before solidifying. Therefore, it is unnecessary to rotate the screws as they pass through the powder application booth.

The thickness of the patch 404 is less than approximately 0.01 inches. In another embodiment, the thickness of the patch 404 is less than 0.003 inches. In another embodiment, the maximum diameter of the patch 404 is less than approximately 0.003 inch over the diameter of the neck 408 of the screw 400. The length of the patch 404 may vary with the size of the screw 400. The length of the patch 404 may be sufficient to cover all the threads of the screw except for a lead-in 402. Preferably, the length of the patch 404 is sufficient to cover approximately 3 to approximately 5 threads. The lead-in 402 is at least 1 to 2 threads.

As shown in FIG. 4A, controlling the vertical dispersion Y' facilitates the creation of a lead-in 402 at the tip of the screw 400 as well as the patch length. In one embodiment, the nozzle insert 104 is created by two semi-circular pegs fitted inside the powder ejection orifice 120 such that a gap 132 exists between the two semi-circular pegs. The gap 132 can be in the shape of a rectangular slit so as to provide a narrow vertical dimension of the powder ejection orifice 120. The size of the gap 132 and the length of the powder ejection orifice 120 may be modified by changing the length and thickness of the insert nozzle 104. One method of changing the dimensions of the insert nozzle 104 is to replace one insert nozzle 104 with another insert nozzle with different dimensions. Another method for changing the dimensions of the insert nozzle 104 is to add components of varying thicknesses inside the gap 132. For example, thin rectangular slabs may be inserted into the gap 132. In another embodiment, the nozzle insert may have moveable parts that can expand or contract to change the dimensions of the nozzle insert 104. The desired dimensions of the gap 132 and the nozzle insert 400 will vary depending on such factors as the size of the screw 404, the amount of pressure applied to the air pulse, the duration of the air pulse, and the amount of powder used.

In another embodiment, the nozzle insert 104 may be replaced with a powder ejection orifice 120 with movable parts such that the size of the powder ejection orifice 120 may be modified.

The support stand 106 provides support to the powder block 102. In one embodiment, the support stand 106 is adjustable so as to allow movement of the powder ejection orifice 120 in an up and down direction, a side-to-side direction, and a forward and backward direction. These degrees of freedom allow for proper positioning of the powder ejection orifice 120 relative to the screw so as to form a proper patch 404 location and size.

In one embodiment, the powder cup 108 is attached to the powder entry orifice 122 of the powder block 102. The powder cup 108 may be in the shape of a funnel and comprise an open top 140 through which the powder can be added and an open bottom 138 through which the powder can exit into the powder block 102.

The micro air-switch valve 110 acts as a quick action gate in conjunction with the precision regulator 112 and the air compressor 114 to control a pulse of air entering into the powder block 102. The micro air-switch valve 110 controls the duration of the air flow. The micro air-switch valve 110 can be adjusted so as to increase or decrease the duration of time of the air flow as well as duration of time the air-switch valve 110 remains closed in between pulses. The duration of air flow may be from approximately 0.01 second to approximately 0.5 second. In one embodiment, the duration of air flow is approximately 0.1 second to approximately 0.3 second.

The precision regulator 112 adjusts the amount of pressure of the air sent into the powder block 102. The air compressor 114 creates about approximately 120 pounds per square inch (psi) of pressurized air. When this pressurized air reaches the precision regulator 112, the precision regulator 112 can modify the amount of pressure from approximately 0 psi to approximately 10 psi. In one embodiment, the pressure of the air is from approximately 0.5 psi to approximately 5 psi.

The programmable logic controller 116 is electronically coupled to the micro air-switch valve 110 to control the duration the air-switch valve 110 remains open. The programmable logic controller 116 may also receive input from an encoder 134. The encoder 134 senses whether a screw is properly aligned with the nozzle insert 104. Upon detection of proper alignment, the encoder 134 sends a signal to the programmable logic controller 116. The programmable logic controller 116 then sends a signal to the micro air-switch valve 110 to open and close for a desired duration to spray the screw 400.

The powder application booth 100 may further comprise a powder feeder 136. The powder feeder 136 may be attached to the open bottom 138 of the powder cup 108 through which the powder is channeled into the powder block 102 to deposit a predetermined amount of the powder into the powder block 102. The predetermined amount varies depending on a variety of parameters such as the size of the screw 400, the patch 404 size, the distance the insert nozzle is away from the screw, the air pressure, and the duration of air flow. Each of these parameters is determined empirically. Various parameters can be changed independently and the data collected to generate a database of which parameter combinations result in the desired patch geometry. A desired patch geometry covers at least 2 threads on the neck of a screw and leaves a lead-in of at least one thread. In one embodiment, the desired patch covers approximately 3-5 threads on the neck of a screw and leaves a lead-in of approximately 1-2 threads.

In another embodiment, the powder application booth 100 may further comprise a standard purge system. The purge system cleans out unused powder in the powder application booth 100.

In another embodiment the powder application booth 100 may further comprise an air dryer 142. The air dryer 142 dries the pressurized air before being pulsed to assure the air is dry prior to entering the powder block 102.

In another embodiment, the powder application booth 100 may further comprise an air filter 144. The air filter 144 assures the air is clean and free of debris prior to entering the powder block 102 as debris can cause problems in the formation of the patch.

In another embodiment the powder application booth 100 may further comprise a standard powder recovery system 154. The powder recovery system 154 is located below the screw 400 to capture powder that does not fuse with the screw 400. The powder recovery system 154 comprises a powder system cabinet 146 to house a vacuum system 152 and a powder chiller/filter 150. The vacuum system 152 provides a suction to capture resin that is ejected through the nozzle insert 104 that either did not remain on the screw or that missed the screw entirely. The powder chiller/filter 150 cools the powder and filters out coagulated powder larger than a single grain of powder as well as other debris from the air. In particular, powder particles may come in contact with the screw and begin melting and coalescing with each other. The particles may not, however, stay on the screw but rather fall off. These coalesced powder particulates would be captured by the powder recovery system 154. However, the coalesced powder would be captured at the powder chiller/filter 150 and discarded as particulates of relatively large size may not be reusable.

The patch application system may further comprise an encoder 134, a rotating disk 500, an induction heating coil 502, a load coil transformer 504, a bowl feeder 600, a screw hopper 602, a screw ejector 506, a parts discharge chute 508, and a cold water/oil quench 510.

The shaft encoder 134 senses the presence of the screw and sends a signal to the programmable logic controller 116 to deliver a puff of air through the powder block 102 to eject the powder onto the screw 400.

The rotating disk 500 delivers the screw 400 to the powder application booth 100. The rotating disk 500 is generally circular and comprises a plurality of apertures 512 to hold a plurality of removable slots 514 configured to accommodate a plurality of screws. The plurality of removable slots 514 are larger than the neck 408 of the screw 400 but smaller than the head 406 of the screw 400 so that the screw 400 can hang vertically by the head 406 inside the slot 514. The plurality of removable slots 514 can range in size so as to accommodate screws of different sizes. Therefore, the powder application booth 100 can be configured to spray powder onto a particular sized screw 400. When completed, the removable slots 514 can be replaced with removable slots 514 of a desired size for a different size screw. The powder application booth 100 can be configured for the new sized screw to spray the appropriate amount of powder at the appropriate location onto the new sized screw.

In another embodiment, the apertures 512 can hold the screws 400. To accommodate screws of a different size, a second rotating disk 500 with apertures 512 of a desired size can replace the first rotating disk 500. Therefore, rather than changing each aperture 512, a single rotating disk 500 can be changed when switching to a screw of a different size.

The induction heating coil 502 is located adjacent to the rotating disk 500 and the powder application booth 100. The rotating disk 500 sends the screw 400 through the induction heating coil 502 where the induction heating coil 502 heats the screw 400 to a temperature that will cause the powder to melt upon contact with the heated screw 400. The rotating disk 500 then delivers the heated screw 400 to the powder application booth 100 where the powder is pulsed onto the heated screw 400.

The RF generator and controller 148 regulates the temperature of the induction heating coil 502, so as to generate enough heat to heat a screw 400 of a particular size to the appropriate temperature during the time it takes for the screw to pass through the induction coil 502. The RF generator and controller 148 controls the load coil transformer 504, via coaxial leads 604, to regulate the temperature of the induction heating coil 502.

Figure 6:
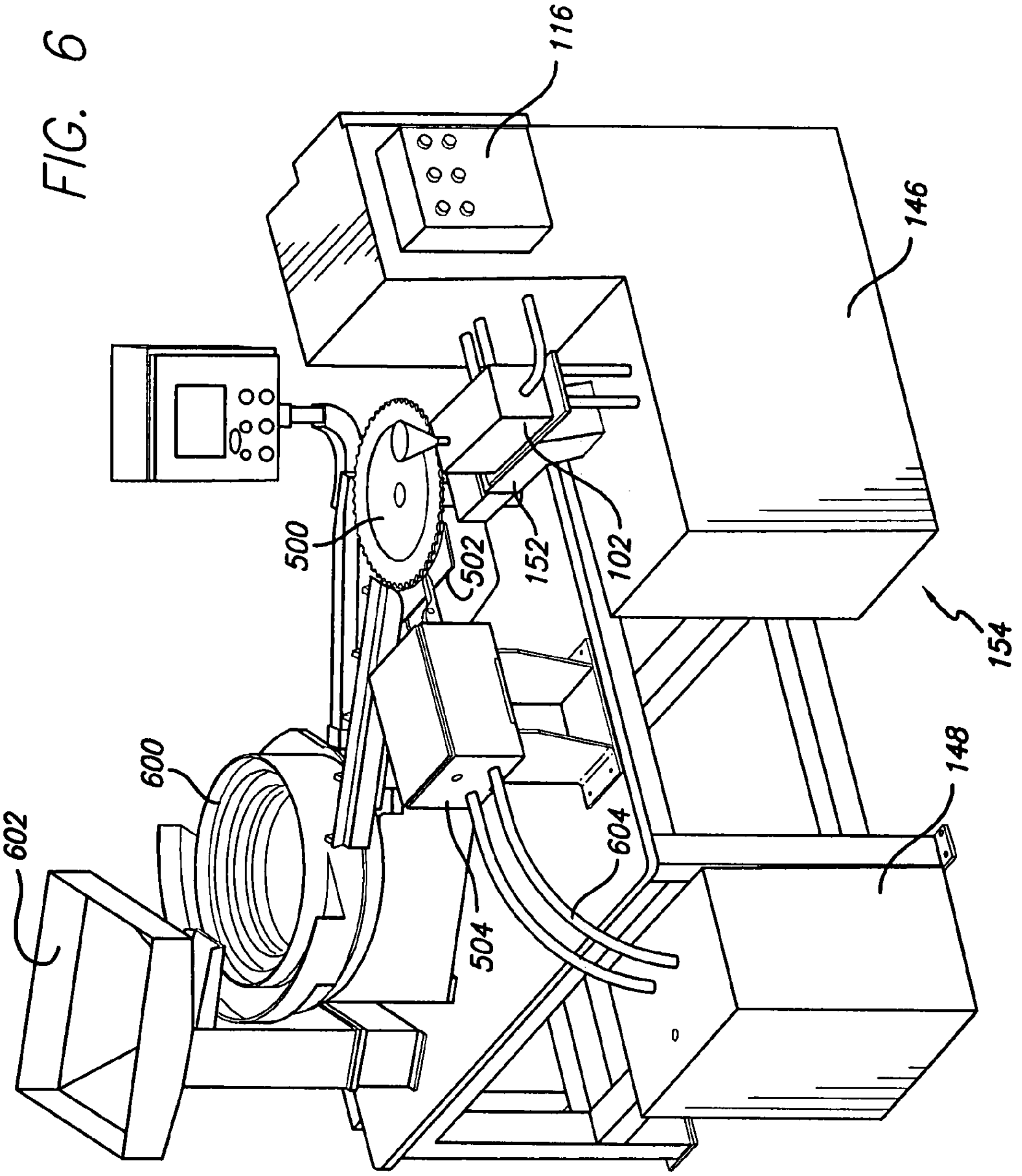
FIG. 6 is a perspective view of an embodiment of the patch application system.

As shown in FIG. 6, the bowl feeder 600 may be adjacent to the rotating disk 500 and delivers the screw 400 into the slot 514 of the rotating disk 500. The screw hopper 602 allows a plurality of screws 400 to be added to the to the bowl feeder 600. Together, the bowl feeder 600, the screw hopper 602, and the rotating disk 500 allow for automated delivery of a large quantity of screws to the powder application booth 100.

The screw ejector 506 is located adjacent to the rotating disk 500 to eject the screw out of the slot 514. The screw 400 is ejected into the parts discharge chute 508. The parts discharge chute 508 sends the screw 400 to the cold water/oil quench 510 located below the parts discharge chute 508 to cool and quench the ejected screw, thereby solidifying the resin onto the screw and providing for safe handling In use, the method of applying a plastic resin patch 404 onto a screw 400 comprises the steps of pre-determining a desired patch geometry on a screw 400; selecting a nozzle insert 104 dimensioned to provide the pre-determined patch geometry; adjusting a distance Z' between the nozzle insert 104 and the screw 400 to create a desired lead-in 402; selecting an amount of powder required to produce the desired patch geometry while minimizing waste; selecting a duration and an amount of air pressure to pulse onto the powder; heating the screw 400 to a temperature sufficient to melt the powder; pulsing air at the selected duration and air pressure through the powder to cause the powder to eject onto the screw 400 and melt onto the screw; quenching the powder melted onto the screw 400 to solidify the powder; comparing a resulting patch geometry with the desired patch geometry; adjusting at least one parameter selected from the group consisting of the nozzle insert 104, the distance Z' between the nozzle insert 104 and the screw, the amount of powder, the duration of the air pulse, and the air pressure; and repeating the aforementioned steps until the desired patch geometry is achieved for a screw of a particular size. This process can be repeated for screws 400 of various sizes and a database can be kept with the relevant information. Preferably, this information is kept on the programmable logic controller 116 so that inputting a screw specification will automatically configure the resin application system to the appropriate specifications.

Once the proper specifications are known for a screw 400 of a particular size the plastic resin can be applied onto a screw 400 by selecting a screw size; selecting a predetermined nozzle insert 104 to produce a desired patch 404 on a screw 400; adjusting the nozzle insert 104 to a predetermined distance Z' from the screw 400; selecting a predetermined air pressure and a predetermined pulse duration; and automatically pulsing a puff of air at the predetermine pressure through a powder block 102 to cause a powder to eject through the insert nozzle 104 onto the screw 400 to form a predetermined patch 404 on the screw 400.

The predetermined distance Z' between the screw and the nozzle insert 104 is approximately 0.001 inch to approximately 1 inch. In another embodiment, the predetermined distance Z' between the screw and the nozzle insert 104 is approximately 0.1 inch to approximately 0.5 inch.

The method of applying powder resin onto a screw can further comprise the steps of continuously rotating a plurality of screws on a rotating disk 500 comprising a plurality of removable slots 514; passing the plurality of screws through an induction coil 502 to heat the screws 400 to a temperature above the melting point of the powder; automatically detecting when the screw 400 is aligned with the insert nozzle 104; and sending a signal to a programmable logic controller 116 to automatically pulse the puff of air through the powder block 102 to cause the powder to eject through the nozzle insert 104 onto the screw 400, thereby coating the screw 400 with the powder.

Additional steps include removing the screw 400 coated with the powder from the rotating disk 500 and quenching the screw coated with the powder in a water/oil solution 510.

The entire process can be automated by providing a screw hopper 602 to provide an unlimited supply of screws 400 and providing a bowl feeder 600 to transfer the plurality of screws 400 from the screw hopper 602 to the rotating disk 500, such that the plurality of screws are inserted into the removable slots 514 of the rotating disk 500 with the head 406 of the screw 400 on top and the neck 408 of the screw fitting through the removable slots 514.

Undoubtedly, numerous variations and modifications of the invention will become readily apparent to those familiar with producing self-locking fasteners. Accordingly, the scope of the invention should not be construed as limited to the specific embodiments depicted and described, but rather is defined in the claims appended hereto.

INDUSTRIAL APPLICABILITY

This invention may be industrially applied to the development, manufacture, and use of an apparatus for and a method of producing self-locking fasteners.

What is claimed is:

1. A method of applying a plastic resin patch onto a screw comprising the steps of:

(a) pre-determining a desired patch geometry on a screw;

(b) selecting a nozzle insert dimensioned to provide the desired patch geometry, wherein the nozzle insert comprises two semi-circular pegs fitted inside a powder ejection orifice of a patch application system such that a gap exists between the two semi-circular pegs, wherein the gap narrows a vertical dimension of the powder ejection orifice;

(c) adjusting a distance between the nozzle insert and the screw to create a lead-in;

(d) selecting and adding an amount of a powder required to produce the desired patch geometry while minimizing waste;

(e) selecting a duration of a pulse of air and an air pressure to pulse onto the powder;

(f) heating the screw to a temperature sufficient to melt the powder;

(g) pulsing air at the duration and the air pressure through the powder to cause the powder to eject onto the screw and melt onto the screw;

(h) quenching the powder melted onto the screw to solidify the powder;

(i) comparing a resulting patch geometry with the desired patch geometry;

(j) adjusting at least one parameter selected from the group consisting of the nozzle insert, the distance between the nozzle insert and the screw, the amount of the powder, the duration of the pulse of air, and the air pressure; and (k) repeating steps (b) through (j) until the desired patch geometry is achieved.

2. A method of applying plastic resin onto a fastener comprising the steps of:

(a) delivering a powder into a chamber of a powder block via a powder entry orifice;

(b) selecting a fastener;

(c) selecting a nozzle insert to produce a desired patch on the fastener;

(d) adjusting the nozzle insert to a predetermined distance from the fastener;

(e) selecting a predetermined air pressure and a predetermined pulse duration; and (f) automatically directing a pulse of air at the predetermined pressure through the chamber of the powder block via an air flow orifice to cause a powder to eject through through the nozzle insert via a powder ejection orifice onto the fastener to form the desired patch on the fastener, wherein the nozzle insert comprises two semi-circular pegs fitted inside the powder ejection orifice such that a gap exists between the two semi-circular pegs, wherein the gap narrows a vertical dimension of the powder ejection orifice.

3. The method of claim 2 wherein the predetermined distance between the fastener and the nozzle insert is approximately 0.01 inch to approximately 1 inch.

4. The method of claim 3, wherein the predetermined distance between the fastener and the nozzle insert is approximately 0.1 inch to approximately 0.5 inch.

5. The method of claim 2 further comprising the steps of:

(a) continuously rotating a plurality of fasteners on a rotating disk, the rotating disk comprising a plurality of removable slots;

(b) passing the plurality of fasteners through an induction coil to heat the plurality of fasteners to a temperature above a melting point of the powder;

(c) automatically detecting when the fastener is aligned with the nozzle insert;

(d) sending a signal to a programmable logic controller to automatically pulse the puff of air through the powder block to cause the powder to eject through the nozzle insert onto the fastener, thereby coating the fastener with the powder.

6. The method of claim 5 further comprising the steps of:

(a) removing the fastener coated with the powder from the rotating disk; and (b) quenching the fastener coated with the powder in a water/oil solution.

7. The method of claim 6 further comprising the steps of:

(a) providing a hopper to provide an unlimited supply of the plurality of fasteners;

(b) providing a bowl feeder to transfer the plurality of fasteners from the hopper to the rotating disk, such that the plurality of fasteners are inserted into the plurality of removable slots of the rotating disk.

8. The method of claim 2, further comprising adding the powder into to the powder block via a powder cup attached to the powder block.

9. The method of claim 2, wherein the nozzle insert is adjusted to the predetermined distance from the fastener via a support stand supporting the powder block, wherein the support stand is adjustable so as to move the nozzle insert in an up and down direction, a side-to-side direction, and a forward and backward direction, to position the nozzle insert in relation to the fastener so as to form a proper patch location.

10. The method of claim 2, wherein the step of automatically detecting when the fastener is aligned with the nozzle insert is accomplished by a shaft encoder.

11. The method of claim 2, further comprising supplying the rotating disk with the plurality of fasteners via a bowl feeder.

12. The method of claim 2, wherein the step of removing the screw coated with the powder from the rotating disk is accomplished by a screw ejector.

* * * * *